L. HOFMEISTER.
AUTOMOBILE TIRE.
APPLICATION FILED MAR. 19, 1917.

1,274,883.

Patented Aug. 6, 1918.

INVENTOR.
Leo Hofmeister.
By Morsell, Keeney & French.
ATTORNEYS

UNITED STATES PATENT OFFICE.

LEO HOFMEISTER, OF MILWAUKEE, WISCONSIN.

AUTOMOBILE-TIRE.

1,274,883.

Specification of Letters Patent.   Patented Aug. 6, 1918.

Application filed March 19, 1917.   Serial No. 155,789.

*To all whom it may concern:*

Be it known that I, LEO HOFMEISTER, a citizen of the United States, and resident of Milwaukee, in the county of Milwaukee and State of Wisconsin, have invented new and useful Improvements in Automobile-Tires, of which the following is a description, reference being had to the accompanying drawings, which are a part of this specification.

The invention relates to pneumatic tires and has for its object to provide a construction whereby its liability to puncture will be reduced to a minimum.

The invention is further designed to provide an automobile tire having an outer casing, an inner self-sustaining pneumatic tire and a layer or intermediate mass of sponge rubber composition of considerable depth interposed between the outer casing and the inner tire.

The invention further consists in the several features hereinafter set forth and more particularly defined by claims at the conclusion hereof.

Figure 1:
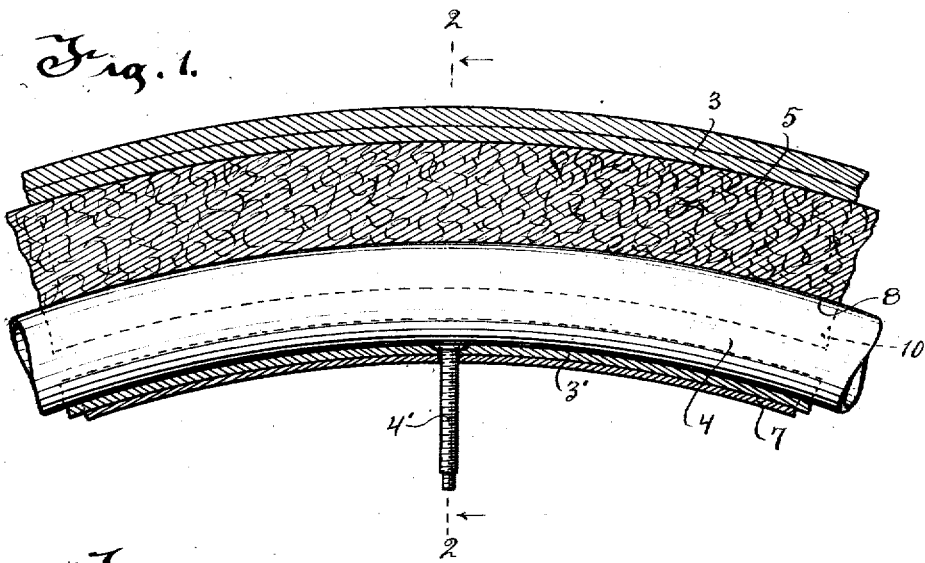
Figure 1 is a vertical sectional view of a portion of the tire embodying the invention.

In general the tire consists of an outer casing 3, an inner self-sustaining pneumatic tire 4, and an intermediate layer of sponge rubber or other yielding composition 5 disposed between the outer casing 3 and the tire 4.

The outer casing 3 may be of any desired construction and is preferably of the clencher type in which the circumferential edges 6 are hooked under or held by the curved flanges of the rim 7 so that when the tire is inflated the outer casing will be firmly held in place upon the rim and so that on the deflation of the tire said casing may be readily detached from the rim. The outer casing 3 is provided with the usual inside fabric flap 3' to protect the inner tire from the rim 7.

The inner pneumatic tire 4 consists of a self-sustaining rubber tube. By the term self-sustaining tube, I mean a tube of limited expansibility so that when said tube is inflated it will sustain the air pressure within it and will not depend for the limiting of its expansibility upon the outer casing as is the case with the usual inner tube. Air is admitted to the tire or casing 4 through a valve 4' of usual construction. The self-sustaining tire may be of an internal diameter such as is commonly used in bicycles and motorcycles so as to provide a space of considerable distance between the top of said tire 4 and the top of the outer casing 3.

The intermediate layer of yielding material 5 is preferably a spongy rubber composition which is interposed between the outer casing 3 and the tire 4 to substantially fill the space therebetween, the lower portion 8 of said composition being curved to conform to the curve of the tire 4 and there being an air space 9 left between the outer and inner tires adjacent the rim 7.

Figure 2:
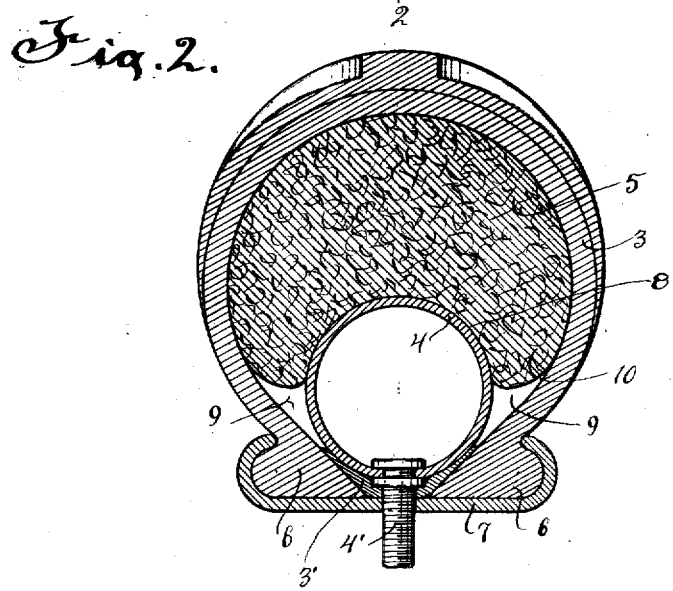
Fig. 2 is a section taken on the line 2—2 of Fig. 1.

With the construction of tire shown and described when the inner tire 4 is inflated as shown in Fig. 2 it will press upwardly against the spongy intermediate portion 5 which in turn will exert pressure against the outer casing 3 to maintain it in expanded position and hold it on the rim and it will be very difficult, in fact almost impossible, for any sharp element, such as nails or tacks, to pierce the inner tire 4 because of the considerable depth of the spongy intermediate portion 5 through which said element would have to pass to puncture the pneumatic tire. Furthermore the formation of the air space 9 between the inner and outer tires relieves the sides of the outer casing of the usual side pressure of the inner tube against it so as to prevent blowouts from the side or rim of the casing, the lower portion 10 of the spongy composition serving to maintain this intermediate air space 9 between the two tires. Furthermore the tube 4 when inflated does not expand laterally into the air space as will be apparent from Fig. 2 and consequently the tube 4 is protected on its sides and the outer casing is also relieved of the side pressure which would occur were said tube 4 expanded laterally against the sides of the outer casing.

It will also be noted when the tire is inflated and meets with an obstruction tending to flatten the tread, the outer casing will be free to stretch laterally because of the local compressibility of the sponge rubber and that the inner tire will be little affected if at all because the force striking the tire is taken up by the outer casing and the intermediate composition.

The cushion 5 is preferably attached to the tire 4 but may be removably disposed between the tires but in either case it is held outwardly against the outer tire by the inflated inner tire without side pressure near the rim portion of the outer tire.

What I claim as my invention is:

1. In a tire, the combination of an outer casing, a separate self-sustaining pneumatic inner casing of limited expansibility, and a layer of yielding material interposed between said inner and outer casings to form a cushion therebetween of considerable depth but only partially filling the space between said casings to form air spaces between said casings adjacent the parts which are attached to the rim of the tire when said inner casing is inflated.

2. In a tire, the combination with a rim, of an outer tubular casing secured thereto, a separate self-sustaining pneumatic tubular casing of limited expansibility of less tubular diameter than the outer casing to space said inner casing from the sides and tread portion of the outer casing above the rim, and a layer of sponge composition interposed between said inner and outer casing but only partially filling the space between said casing to form air spaces between the casings adjacent the rim when said inner casing is inflated.

3. In a tire, the combination, with a rim, of an outer casing detachably secured to said rim, a self-sustaining pneumatic inner casing of limited expansibility disposed within the outer casing adjacent said rim and being of smaller diameter than the outer casing so as to be within it and be spaced from the sides and top of the interior of the outer casing when inflated, and a layer of yielding material disposed between the tread portion of the outer casing and that of the inner casing, said inner casing serving to hold said outer casing in tension without exerting side pressure against the sides of said outer casing adjacent the rim.

In testimony whereof I affix my signature.

LEO HOFMEISTER.